3,178,489
MULTI-STAGE POLYMERIZATION PROCESS FOR PREPARING TRANSPARENT COMPOSITIONS
Hans E. Lunk, Oakland, and Carl W. Schroeder, Orinda, Calif., assignors to Shell Oil Company, New York, N.Y., a corporation of Delaware
No Drawing. Filed July 18, 1961, Ser. No. 124,776
1 Claim. (Cl. 260—880)

This invention relates to transparent thermoplastic compositions suitable for molding, characterized by unusual combinations of desirable properties including good tensile strength, impact strength, hardness and transparency.

Polystyrene is a widely accepted commercial material. In many applications it is desirable both because of its strength and hardness and because of its transparency, which permits it to be used clear or in attractive transparent colored shapes. A disadvantage of polystyrene is that it has an undesirably low impact resistance. It is known that the impact resistance of polystyrene can be improved by incorporating therein a small amount of a natural or synthetic rubber. When thus compounded, however, polystyrene loses its transparency and becomes opaque.

Some attempts have been made to produce a modified polystyrene having good impact resistance and transparency. One proposed method consists of polymerizing from 50 to 60% by weight of styrene or similar monovinyl aromatic hydrocarbon with from 50 to 40% of ethyl acrylate or other alkyl acrylate, together with 5 to 10% of a rubbery butadiene-styrene copolymer. Compositions of this type which contain sufficient rubber to provide the desirable impact strength unfortunately have relatively low tensile strength, hardness and heat distortion temperatures.

In another attempt to provide acceptable polymers it has been proposed to physically mix from 30 to 70% of a copolymer of 55 to 95% of vinyl toluene, styrene or the like with from 45 to 5% of methyl methacrylate or other alkyl methacrylate and from 70 to 30% of a copolymer of styrene and butadiene. A homogeneous composition of the two types of materials would be prepared by physical mixing methods such as heat plastifying and mechanically working the mixture,, e.g., on compounding rolls or in a Banbury mixer. Compared with the usual formulation of high impact polystyrene, the mixtures prepared in this manner contain an extremely high proportion of rubbery butadiene-styrene copolymer and are accordingly very low in hardness and tensile properties and have poor aging characteristics.

It is an object of this invention to provide transparent plastic compositions of methyl methacrylate, styrene and butadiene-styrene copolymer which are characterized by high tensile strength, hardness and impact resistance and low rubbery copolymer contents. It is another object to provide novel transparent compositions of methyl methacrylate-styrene copolymer and butadiene-styrene copolymer. Another object is to provide methods for producing those novel materials in a simple polymerization process. Other objects of this invention will appear from the following description.

In one embodiment, this invention comprises transparent thermoplastic compositions of high impact strength comprising from 5 to 10 percent by weight of butadiene-styrene copolymer embedded in a styrene-methyl methacrylate matrix resulting from the interpolymerization of a solution of styrene-butadiene copolymer in styrene and methyl methacrylate, wherein the percentage of styrene in said copolymer, $S_1$, is from 20 to 55 and the percentage of styrene in the resulting styrene-methyl methacrylate matrix, $S_2$, equals $S_1 + 15 \pm 7$.

In a second embodiment this invention comprises a process for the production of transparent thermoplastic compositions of the type described in which in a multi-stage reaction system a solution of styrene-butadiene copolymer in from 23 to 72 parts by weight of methyl methacrylate and from 77 to 28 parts by weight of styrene is reacted in controlled fashion such that from 5 to 50 percent of the polymerization takes place in the first polymerization zone and the remainder of the polymerization takes place in at least one subsequent polymerization zone at a higher temperature.

The copolymers of styrene and butadiene which are used as one starting ingredient in the preparation of the compositions of this invention are well known materials of commerce. They are synthetic rubbers which were originally known under the designation GR–S and are now generally designated SBR. For use in this invention, these rubbers contain from 20 to 55% by weight of styrene and from 45 to 80% by weight of butadiene. The standard type of this rubber contains about 77% by weight butadiene and about 2.3% styrene. Others are made which contain, for example, butadiene to styrene ratios of 71:29, 57:43, 55:45, 50:50 and 45:55. In the composition of this invention, SBR copolymers having styrene contents between 20% and 40% by weight are preferred.

Methods of making SBR copolymers are well known. They are prepared by emulsion polymerization in which a mixture of the monomers is dispersed in an aqueous solution of an emulsifying agent, agitated and heated to copolymerize the monomers. The polymerization is accelerated by the addition of suitable free radical generating catalysts, such as peroxides. Standard recipes for the production of SBR copolymers are available. The SBR copolymers are materials of commerce; they are employed in the process of this invention in their finished unvulcanized, uncompounded form, i.e., without the addition of oil extenders, carbon black or the like, although they may contain minor amounts of conventional rubber chemicals, such as antioxidants.

The polymerization process of this invention is a bulk or mass polymerization in which the rubber is dissolved in the mixture of the two monomers to be copolymerized and the resulting solution is heated under conditions suitable for the production of the desired product.

The polymerization may be carried out in batch or continuous fashion and in one or a plurality of vessels. Various methods for carrying out the bulk polymerization of styrene to produce polystyrene are well known and these methods are generally also suitable for the proceeds of this invention.

Suitable equipment for carrying out the polymerization includes kettles provided with heat exchange means, with or without agitators; columns or towers provided with heat exchange means, with or without agitators; extruders or smilar machines provided with heat exchange means in which the polymerization mass is moved by mechanical means; and any other equipment in which a relatively viscous polymerization mass can be maintained at elevated temperatures with provision for heat removal or addition.

A particularly useful system comprises a first polymerization stage consisting of an agitated jacketed kettle in which polymerization is carried out to a limited degree of conversion, followed by a second stage consisting of a vertical tower provided with heat removal and heating means that are separately controllable superimposed sections of the tower. The partially polymerized reaction mass is transferred from the kettle to the top of the tower; the remainder of the polymerization takes place in the tower as the reaction mass slowly passes down therethrough. The substantially completely polymerized reaction mass is withdrawn from the bottom of the tower and suitably passed to a devolatilizing extruder. In general, the polymerized material contains at least some small amount of unconverted monomers and this is removed by devolatilization, e.g., by heating the product to its melting temperature or above under sub-atmospheric pressure or by milling, compounding or otherwise mechanically working the product while in a heat plastified condition.

Conditions during the polymerization generally include a series of progressively increasing temperatures in the range from 60° to 220° C. Preferably, the first part of the polymerization is carried out at temperatures between 90° and 120° C. and more preferably between 100 and 110° C. and the remainder of the polymerization at temperatures between 130° and 200° C. and more preferably between 145 to 195° C.

The viscosity of the reaction mixture puts a practical limit on the degree of conversion in the prepolymerizer. In the preferred method, without use of chain transfer agent, conversion in the first stage is held to about 20%. Where chain transfer agent is used, conversion may be as high as 50% in the prepolymerizer. Suitable chain transfer agents include sulfhydryl compounds, e.g., dodecyl mercaptan and 2-mercaptoethanol.

While the polymerization is generally carried out in the absence of a catalyst, it may sometimes be desirable to add a catalyst of the free radical generating type. Suitable polymerization catalysts of this type are peroxides, such as benzoyl peroxide, lauroyl peroxide and others well known in this art, which are generally added in concentrations from 0.01 to 0.1% by weight of the polymerized monomers.

The polymerization may be carried out in the presence of small amounts of other compounds which are known to be useful in similar polymerizations, such as styrene polymerization. This includes low concentrations of lubricants or flow agents, such as mineral oil in the 100–500 SSU viscosity range, paraffin wax, butyl stearate or soybean oil, used in concentration of up to about 10% by weight. Polymerization modifiers such as laurylmercaptan, diisopropyl xanthate, or methallylphosphate may be added to the reaction mass. Oxidation stabilizers and light stabilizers such as 2,6-di-tert-butyl-4-methylphenol, 2-alkyl-1,2,3-benzyltriazole (Tinuvin-P) and the like may also be incorporated in the polymerization mass. Color masking agent may be added, such as small amounts of blue dye. Other additives which are known to be useful in similar polymerizations can also be added for similar effects.

The relative proportions of reactive ingredients used in the polymerization process of this invention to provide the novel products of the invention must be maintained within critical limits in order to obtain the advantages of the invention, consisting of transparent, moldable polymers of excellent strength and hardness. The amount of SBR copolymer employed is in the range from 5 to 10 parts per 100 parts of components of the matrix, although for some purposes as little as 1 part or as much as 15 parts may be used, at some sacrifice in one or another physical property. The ratio of styrene to methyl methacrylate in the matrix is determined by the ratio of styrene to butadiene in the SBR copolymer. For best results and superior transparency, the styrene content of the matrix, expressed in percent by weight of the matrix, is approximately numerically equal to 15 plus the styrene content of the SBR expressed as percent by weight of the SBR. In other words, if $S_1$ is the styrene content of the SBR expressed as percent by weight thereof and $S_2$ is the styrene content of the matrix expressed as percent by weight of the mixture of styrene monomer and methyl methacrylate monomer, then for best results, including maximum light transmission:

$$S_2 = S_1 + 15 \tag{1}$$

This relationship is rather precisely applicable for values of S between 20 and 40%, the preferred range for use in this invention. At SBR styrene content between 40 and 55%, best results are obtained at styrene contents of the matrix which gradually approach $S_1+10$ at $S_1=55\%$.

It has been found that the transparency of the compositions is still acceptable within a moderately wide composition range from that expressed by Equation 1. In general, most compositions in which $$S_2 = S_1 + 15 \pm 7 \tag{2}$$

have acceptable transparency and light transmission. Outside this range, the light transmission of compositions decreases very rapidly and the resulting products are progressively more opaque.

From Equation 2 above, it is evident that according to this invention, the minimum amount of styrene in the matrix composition is about 28% by weight and the maximum about 77% by weight, while from Equation 1 the preferred range of styrene content in the matrix runs from 35% to 70%. When the standard type of SBR is employed, which contains about 23% styrene, the preferred styrene content in the matrix is seen from Equation 1 to be about 38% and the total useful range is seen from Equation 2 to be between about 31% and 45% styrene, the remainder being methyl methacrylate. The refractive index of styrene-methyl methacrylate copolymer, in white light at 25° C., relates to styrene contents as follows (number rounded off): 1:52 at 28%; 1.53 at 35%; 1.56 at 70%; and 1.57 at 77%. The refractive index of SBR is about 1.53 at 20% styrene and 1.56 at 55% styrene. When Equation 1 is followed, the refractive index of the matrix is approximately the same during most of the range as that of SBR. It should be understood that the refractive index of SBR when incorporated in the styrene-methyl methacrylate matrix will differ from that of SBR alone, due to modification of the rubber by graft polymerization.

It has been found that the relationship of the polymerization rates of styrene and methyl methacrylate is such that the matrix composition formed in the process of this invention is not substantially different from the ratio of the respective monomers in the original reaction mixture. Thus, in general, it will be satisfactory in the process of this invention to prepare a reaction mixture in which the proportion of styrene and methyl methacrylate has the numerical value calculated from the above relationship of $S_2$ and $S_1$. Since the precise relationship between the composition of the product and the composition of the reaction mixture is determined by the specific equipment and reaction conditions employed, adjustments in the monomer ratio or the reaction conditions can be made, based on experience, to provide a product having a desired composition within the above defined limits.

The following examples illustrate preferred methods of operating the process of this invention and preferred compositions produced thereby. The invention is not to be considered as restricted by the scope of the examples. Unless otherwise indicated, parts and percentages are by weight.

EXAMPLE 1

In a 2-stage method in which a high degree of conversion is obtained in the first or pre-polymerizer stage, the reaction mixture of rubber, styrene and methyl methacrylate is held in a stirred kettle for 10 to 15 hours at 110° C., whereby 40 to 55% of the monomer mixture is converted to polymer; this is followed by holding the reaction mixture for two hours at 145° C. and thereafter for twelve hours at 185° C. whereby polymer conversion is increased to over 98%. In this method, a chain transfer agent such as 2-mercaptoethanol is added in the first stage to maintain the molecular weight at a desired reasonably low value.

After polymerization is complete the polymer is milled 5 minutes at 170° C. on a 6-inch 2-roll differential speed mill. This is a conventional treatment which results in homogenizing the product and reducing the residual monomers to a level of less than 0.3% by weight, which is considered acceptable.

Test specimens for measuring the physical properties of the polymer are prepared by compression molding at 185° C. and 1500 p.s.i.g.

EXAMPLE 2

Compositions according to this invention can be prepared by a 2-stage process in which low conversion is obtained in the first stage and no chain transfer agent is used. In this process, the mixture of rubber, styrene and methyl methacrylate is placed in a first stirred reactor in which it is maintained at 100° C. for from 8 to 15 hours, whereby 5 to 20% of the monomers is converted to copolymer; the mixture is then held at 145° C. for two hours and at 185° C. for twelve hours, resulting in a polymer having less than 2% of unconverted monomer.

The devolatilizing and finishing of the polymer is the same as in Example 1.

EXAMPLES 3 TO 9

A number of different compositions varying in the proportion of styrene and methyl methacrylate is prepared, in which the rubbery co-polymer used is a commercial grade of SBR rubber, having 23.5% styrene and 76.5% butadiene, prepared at 50° C. and classified as a hot rubber. The rubber is present in the final product in the concentration of 10% by weight.

The light transmission of 0.1 inch thick specimens of the respective products is tested at 420 and 620 millimicrons. It is reported as percent of incident light transmitted.

In the following Table 1, there are shown the percentages of styrene and of methyl methacrylate (M.M.A.) and the light transmission of the samples.

Since the styrene content of the copolymer is 23.5, the range defined by Equation 2 above is from 31.5 to 45.5% styrene in the matrix, with a preferred value at 38.5%. Examples 5 and 6, which lie within the range, have the best light transmission at both measured wave lengths; Example 7, which is just within the range, still has fairly good light transmission, while the light transmission of Example 4, which is somewhat outside the range, is still fair at the long wave length but has already dropped substantially at the shorter wave length.

Table 1

| Example | 3 | 4 | 5 | 6 | 7 | 8 | 9 |
|---|---|---|---|---|---|---|---|
| Styrene, percent | 25 | 30 | 35 | 40 | 45 | 50 | 55 |
| M.M.A., percent | 75 | 70 | 65 | 60 | 55 | 50 | 45 |
| Light Transmission, percent (0.1-inch thick specimen): | | | | | | | |
| At 420 mμ | 31 | 55 | 70 | 73 | 62 | 51 | 35 |
| At 640 mμ | 65 | 77 | 83 | 82 | 77 | 69 | 62 |

EXAMPLES 10 TO 12

Examples 3-9 above illustrate the effect of differences between styrene content of matrix and copolymer on light transmission. However, the concentration of rubber in the composition also has an effect. Thus, better transparency is obtained at lower rubber contents. This is illustrated by the compositions in Table 2 in which the rubber contents vary from 5 to 10% by weight. The rubber is the same as used in Examples 3-9. Example 10 illustrates the transparency of commercial polystyrene measured under the same conditions as Examples 11 and 12.

Table 2

| Example | Percent rubber | Light Transmission, percent (0.1-inch thick specimen) | |
|---|---|---|---|
| | | 420 mμ | 620 mμ |
| 10 | 0 | 82 | 87 |
| 11 | 6 | 78 | 83 |
| 12 | 10 | 74 | 81 |

EXAMPLES 13 TO 16

Examples 10-12 above illustrate that transparency is improved as the rubber content of the copolymer composition is decreased. The data in Table 3 illustrate that decreasing the rubber content at the same time decreases the impact strength of the product, while, however, increasing the hardness and tensile yield strength. Example 16 shows the same data for a good commercial grade of high impact polystyrene.

Table 3

| Example | 13 | 14 | 15 | 16 |
|---|---|---|---|---|
| Copolymer, Percent | 6 | 8 | 10 | 6 |
| M.M.A., Percent | 56.4 | 55.2 | 54 | 0 |
| Styrene, Percent | 37.6 | 36.8 | 36 | 100 |
| Izod Impact Strength, ft.-lb./in. notch | 0.7-0.9 | 0.8-1.0 | 1.0-1.5 | 0.86 |
| Hardness, Rockwell M | 50-60 | 30-40 | 15-20 | 35 |
| Yield Strength, p.s.i. | 6,000-7,000 | 5,000-5,500 | 3,800-4,500 | 3,604 |
| I.V.[1], dl./g. | 0.65-0.90 | 0.65-0.80 | 0.63-0.80 | 0.75 |

[1] Intrinsic viscosity.

EXAMPLE 17

Example 15 is repeated with 10% of a hot SBR rubber having about 43% styrene and 57% butadiene. The matrix contains 54% styrene and 46% methyl methacrylate. The resulting clear, transparent polymer has the following properties:

Izod impact, ft.-lb./in. notch _____ 0.98
Hardness, Rockwell M _____ 39
Yield strength, p.s.i. _____ 6565
I.V. _____ 0.90

Polymers of satisfactory strength and good transparency are similarly prepared with cold rubber of similar compositions as those of Examples 3, etc., and 17.

We claim as our invention:

A process for the production of transparent thermoplastic compositions of high impact strength, comprising interpolymerizing in a multistage reaction system a solution of a copolymer of about 23 percent by weight styrene and about 77 percent butadiene, in 100 parts of a mixture of from about 31 to 45 parts by weight styrene and from about 69 to 55 parts by weight methyl methacrylate, the reaction being controlled so that from 5 to 50 percent of the polymerization takes place in a first polymerization zone under agitation at temperatures from 100 to 110° C. and the remainder of the polymerization takes place in at least one subsequent polymerization zone at temperatures in the range from 145 to 195° C., at least the first two hours thereof being at about 145° C.

(References on following page)

References Cited by the Examiner

UNITED STATES PATENTS 3,029,223  4/62  Hibbard _____ 260—880
3,074,906  1/63  Calvert _____ 260—880

FOREIGN PATENTS 594,733  3/60  Canada.

MURRAY TILLMAN, *Primary Examiner.*
WILLIAM H. SHORT, *Examiner.*